United States Patent
Shirai et al.

(10) Patent No.: US 9,555,748 B2
(45) Date of Patent: Jan. 31, 2017

(54) VEHICLE-USE RESIN COVER

(71) Applicant: NHK SPRING CO., LTD., Yokohama-shi (JP)

(72) Inventors: Jun Shirai, Yokohama (JP); Taisuke Matsuzaki, Yokohama (JP); Yuta Takagi, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/734,699

(22) Filed: Jun. 9, 2015

(65) Prior Publication Data
US 2015/0360622 A1 Dec. 17, 2015

(30) Foreign Application Priority Data

Jun. 11, 2014 (JP) ................................. 2014-120653

(51) Int. Cl.
- *B60R 13/02* (2006.01)
- *B60N 2/015* (2006.01)
- *B60N 2/07* (2006.01)

(52) U.S. Cl.
CPC ............... *B60R 13/02* (2013.01); *B60N 2/015* (2013.01); *B60N 2/0725* (2013.01); *B60R 13/0275* (2013.01)

(58) Field of Classification Search
CPC ..... B60R 13/02; B60R 13/0275; B60N 2/015; B60N 2/0725
USPC ............................................. 296/1.08, 24.34
See application file for complete search history.

(56) References Cited

U.S. PATENT DOCUMENTS

| | | | | |
|---|---|---|---|---|
| 5,664,697 A * | 9/1997 | Lambelet, Jr. | ..... | B65D 83/0454 206/533 |
| 6,959,954 B2 * | 11/2005 | Brandt | ...................... | B60R 7/10 224/313 |
| 7,445,233 B2 * | 11/2008 | McKimson | ........... | B60R 13/025 280/728.2 |
| 7,625,037 B2 * | 12/2009 | Gollehur | ................ | B62D 25/24 296/193.07 |
| 8,336,938 B2 * | 12/2012 | Kouno | ................ | B60R 13/0206 296/1.08 |

(Continued)

FOREIGN PATENT DOCUMENTS

JP 2008-137567 A 6/2008
JP 2009287175 A * 12/2009

*Primary Examiner* — Pinel Romain
(74) *Attorney, Agent, or Firm* — Knobbe Martens Olson & Bear LLP

(57) ABSTRACT

A vehicle-use resin cover including: a resin cover main body configured including an opening, and anchoring portions formed at locations running along a peripheral edge of the opening; a resin cap member, which is mounted in the opening and is configured including a cap main body that covers the opening, and anchored portions, which are provided to an outer peripheral portion of the cap main body so as to correspond to the anchoring portions and are anchored by the anchoring portions; a recessed portion, which is formed at the peripheral edge of the opening and is in communication with the opening at the cap member side of the recessed portion, and through which a leading end of a tool for removing the cap member is insertable; and a marker portion provided to the outer peripheral portion of the cap main body at a position facing the recessed portion.

4 Claims, 6 Drawing Sheets

(56) References Cited

U.S. PATENT DOCUMENTS

2015/0102621 A1\* 4/2015 Smyth .................... B60R 13/02
  296/1.08
2015/0232043 A1\* 8/2015 Buza .................. B60R 13/0206
  296/24.34

\* cited by examiner

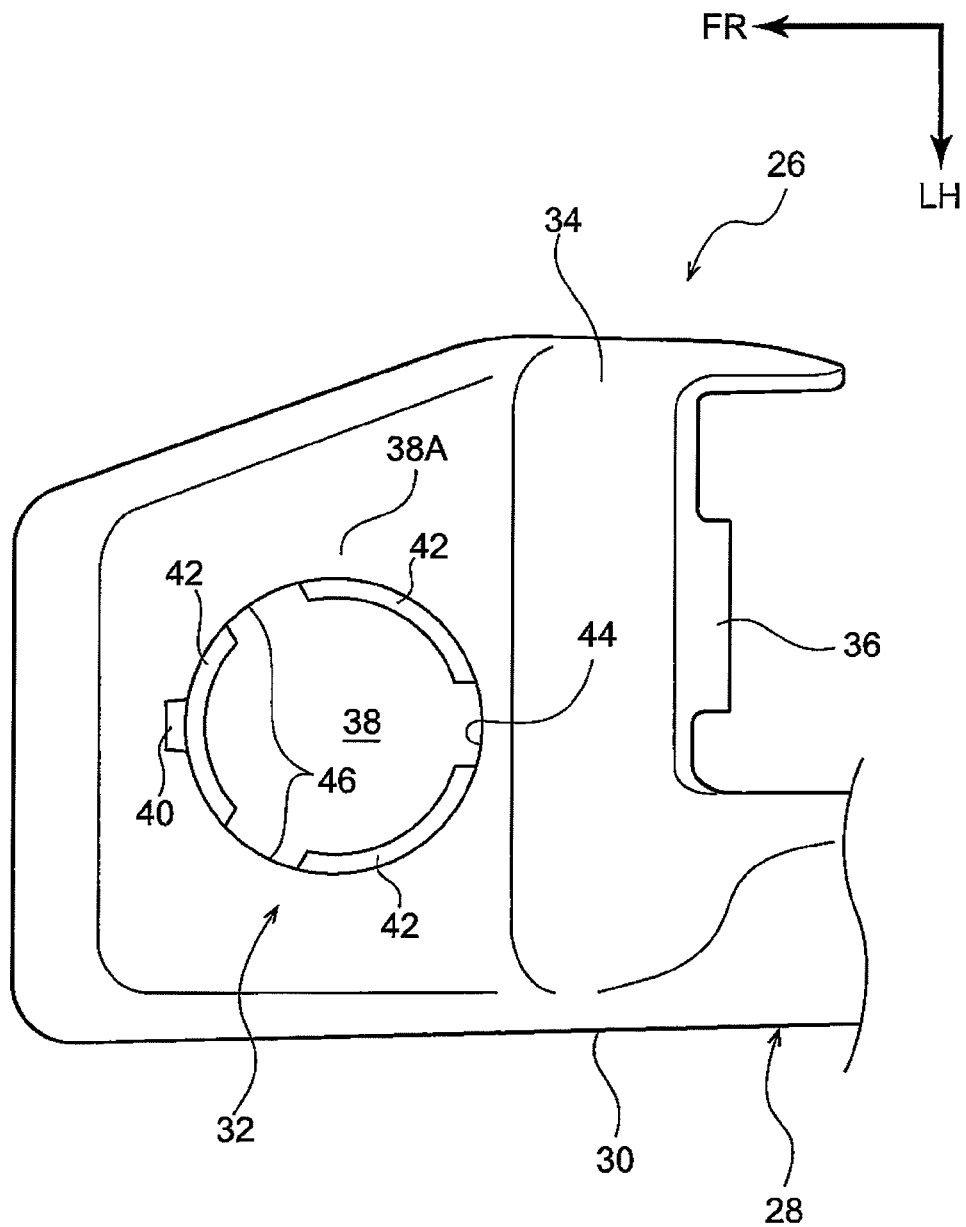

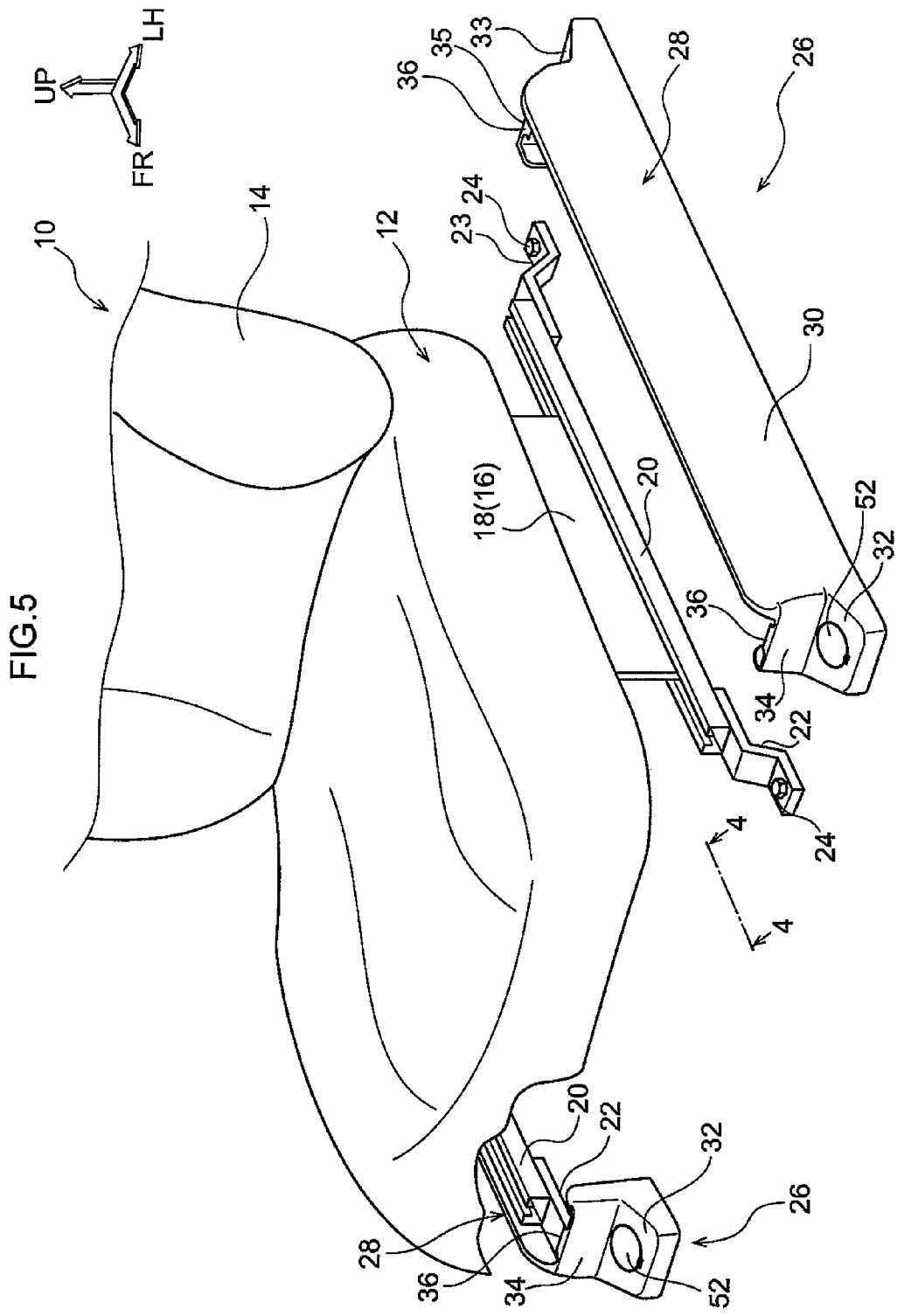

VEHICLE-USE RESIN COVER

CROSS-REFERENCE TO RELATED APPLICATION

This application is based on and claims priority under 35 USC 119 from Japanese Patent Application No. 2014-120653 filed on Jun. 11, 2014, the disclosure of which is incorporated by reference herein.

BACKGROUND

Technical Field

The present invention relates to a vehicle-use resin cover.

Related Art

Japanese Patent Application Laid-Open (JP-A) No. 2008-137567 describes an invention relating to an attachment structure of a cap for a resin cover. In the attachment structure of the cap for the resin cover, a resin cover main body disposed on the vehicle side is provided with a recessed portion for mounting a cap member similarly made of resin, and an anchor hole is formed to a bottom wall of the recessed portion. An anchored portion of the cap member is thereby anchored at the anchor hole of the cover main body, enabling the cap member to be fixed to the recessed portion when attaching the cap member.

A groove portion for removing the cap member is formed to a peripheral edge of the recessed portion. This enables the anchored portion of the cap member to be detached from the anchor hole of the cover main body when removing the cap member, by inserting a tool into the groove portion for removing the cap member of the cover main body, and employing the tool as a lever. The related art described in JP-A No. 2008-137567 thereby enables workability when attaching and removing the cap member to be secured.

However, in the related art described in JP-A No. 2008-137567, there is no marker on the cap member to indicate the attachment direction. Thus the position of the anchored portion of the cap member and the position of the anchor hole of the cover main body need to be visually checked before attaching the cap member, thus the working time becomes longer. Moreover, if the checking of the position of the anchored portion of the cap member and the position of the anchor hole of the cover main body was neglected, it is conceivable that the anchored portion of the cap member could be damaged due to incorrect assembly.

SUMMARY

In consideration of the above circumstances, an object of the present invention is to obtain a vehicle-use resin cover capable of preventing incorrect assembly of a cap member, while securing workability when attaching and removing the cap member.

A first aspect of the present invention provides a vehicle-use resin cover including:

a resin cover main body that is configured including an opening, and anchoring portions formed at plural locations running along a peripheral edge of the opening;

a resin cap member that is mounted in the opening and that is configured including a cap main body that covers the opening, and plural anchored portions that are provided to an outer peripheral portion of the cap main body so as to correspond to the anchoring portions and that are anchored by the anchoring portions;

a recessed portion that is formed at the peripheral edge of the opening, that is in communication with the opening at the cap member side of the recessed portion, and through which a leading end of a tool for removing the cap member is insertable; and a marker portion that is provided to the outer peripheral portion of the cap main body at a position facing the recessed portion.

A second aspect of the present invention provides the vehicle-use resin cover of the first aspect, wherein a pivot point is provided to the recessed portion so as to configure a pivot point of the tool when removing the cap member.

A third aspect of the present invention provides the vehicle-use resin cover of the first aspect, wherein:

a rib portion that projects out toward the cover main body side is formed to the cap main body;

a bearing portion that supports the rib portion is integrally provided to the cover main body at the peripheral edge of the opening; and the marker portion is configured by a cutout portion that is formed open at the recessed portion side so as to enable the leading end of the tool to abut the bearing portion, and is disposed such that a peripheral edge of the cutout portion and the bearing portion face each other across a space.

A fourth aspect of the present invention provides the vehicle-use resin cover of the first aspect, wherein:

one of the anchored portions is provided at a position with point symmetry to the marker portion about the center of the cap member in a plan view, and configures a pivot point of the cap member when removing the cap member.

In the first aspect of the present invention, the opening is provided to the resin cover main body, and the anchoring portions are formed at plural locations running around the peripheral edge of the opening. The plural anchored portions are provided to the outer peripheral portion of the cap main body of the resin cap member so as to correspond to the anchoring portions. Thus the cap member is mounted in the opening of the cover main body, and the opening is covered by the cap main body by anchoring the anchored portions to the anchoring portions when attaching the cap member.

Moreover, the recessed portion is formed to the peripheral edge of the opening, the cap member side of the recessed portion is in communication with the opening, and the leading end of the tool for removing the cap member is insertable through the recessed portion. Thus by inserting the leading end of the tool into the recessed portion, abutting the leading end against the cap member, and lifting up the cap member using the tool when removing the cap member, the anchored portions of the cap member can be detached from the anchoring portions of the cover main body when removing the cap member.

If there was no marker on the cap member to indicate the attachment direction, the cap member would need to be attached after visibly checking the positions of the anchored portions of the cap member and the positions of the anchoring portions of the cover main body, thus the working time would be longer. Moreover, if the checking of the positions of the anchored portions of the cap member and the positions of the anchoring portions of the cover main body was neglected, it is conceivable that the anchored portions of the cap member could be damaged due to incorrect assembly.

However, in the present invention, the marker portion is provided to the outer peripheral portion of the cap main body at a position facing the recessed portion of the cover main body. This enables the positions of the anchoring portions of the cover main body and the positions of the anchored portions of the cap member to be aligned, by disposing the cap member so that the marker portion of the cap member and the recessed portion of the cover main body face each other when attaching the cap member. This enables the position of the cap member to be aligned without visually checking the positions of the anchored portions of the cap member and the positions of the anchoring portions of the cover main body when attaching the cap member.

In the second aspect of the present invention, the pivot point is provided to the recessed portion of the cover main body so as to configure a pivot point of the tool when removing the cap member, such that the tool acts as a lever with the pivot point as a pivot point.

In the third aspect of the present invention, the rib portion that projects out toward the cover main body side is formed to the cap main body, and the bearing portion that supports the rib portion is integrally provided to the cover main body at the peripheral edge of the opening of the cover main body. Moreover, the cutout portion serving as the marker portion is provided to the cap main body, and the cutout portion is formed open at the recessed portion side of the cover main body, so as to enable the leading end of the tool to abut the bearing portion. The peripheral edge of the cutout portion and the bearing portion of the cover main body are disposed facing each other across a space. This enables the tool to be inserted into the space between the peripheral edge of the cutout portion and the bearing portion of the cover main body while being inserted into the cutout portion of the cap member when removing the cap member. This enables the cap member to be lifted up from the lower side of the cap member and removed using the tool.

In the fourth aspect of the present invention, one of the anchored portions is provided at a position with point symmetry to the marker portion about the center of the cap member in plan view, and configures a pivot point of the cap member when removing the cap member. Thus the anchored portion forms a pivot point about which the cap member turns when removing the cap member, thereby enabling a moment arm of moment occurring in the cap member to be lengthened. This enables force to detach the anchored portions other than this anchored portion from the anchoring portions of the cover main body to be increased when removing the cap member.

As explained above, the vehicle-use resin cover of the first aspect of the present invention has an excellent advantageous effect of enabling incorrect assembly of the cap member to be prevented, while securing workability when attaching and removing the cap member.

The vehicle-use resin cover of the second aspect of the present invention has an excellent advantageous effect of enabling the cap member to be removed without applying a large force, by employing the tool as a lever when removing the cap member.

The vehicle-use resin cover of the third aspect of the present invention has an excellent advantageous effect of enabling force to be efficiently transmitted from the tool to the cap member when removing the cap member.

The vehicle-use resin cover of the fourth aspect of the present invention has an excellent advantageous effect of enabling the cap member to be removed without applying a large force, by employing the cap member as a lever when removing the cap member.

BRIEF DESCRIPTION OF THE DRAWINGS

Exemplary embodiments of the present invention will be described in detail based on the following figures, wherein:

FIG. 2 is an enlarged plan view illustrating a structure of the periphery of an opening of a cover main body according to the first exemplary embodiment;

FIG. 5 is a perspective view illustrating a vehicle seat according to the present exemplary embodiment.

DETAILED DESCRIPTION

First Exemplary Embodiment

Figure 1:
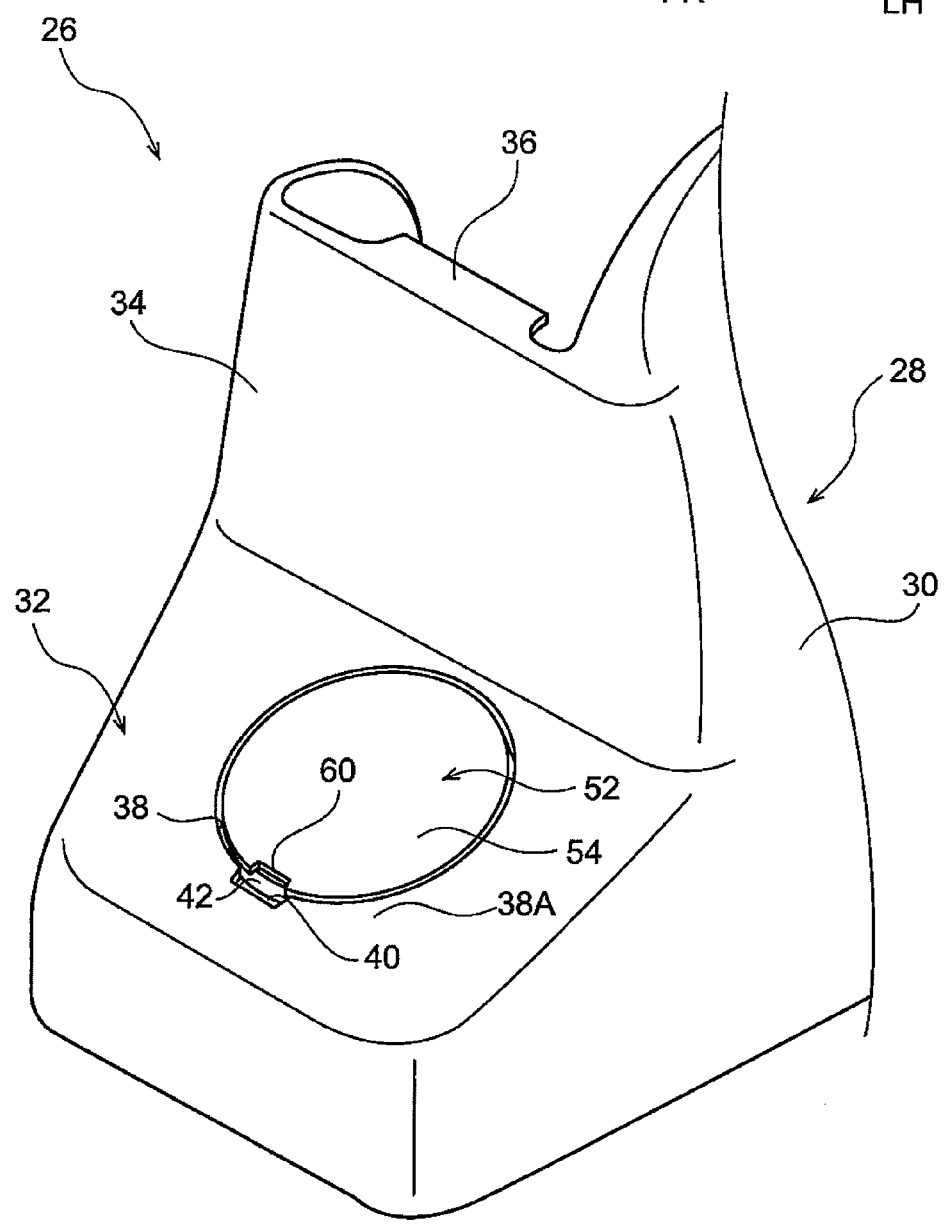
FIG. 1 is an enlarged perspective view illustrating a relationship between a cover main body and a cap member according to a first exemplary embodiment.

Explanation follows regarding configuration of a vehicle seat 10 including a leg cover 26 serving as a vehicle-use resin cover according to a first exemplary embodiment according to the present invention, with reference to FIG. 1 to FIG. 5. Note that in each of the drawings as appropriate, the arrow FR, the arrow UP, and the arrow LH indicate the front direction, the upward direction, and the left direction, respectively, of the vehicle seat 10. In the present exemplary embodiment, the front direction, the upward direction, and the left direction of the vehicle seat 10 respectively match the front direction, the upward direction, and the left direction of a vehicle installed with the vehicle seat 10.

Explanation first follows regarding an example of an overall configuration of the vehicle seat 10. As illustrated in FIG. 5, the vehicle seat 10 is a front seat installed at the vehicle front side in the vehicle cabin of the vehicle. The vehicle seat 10 is configured including a seat cushion 12 supporting the buttocks and thighs of an occupant, a seat-back 14 supporting the back of the occupant, and a headrest, not illustrated in the drawings, supporting the head of the occupant.

The seat cushion 12 is configured including a cushion pad, not illustrated in the drawings, and a seat cushion frame 16. The seat cushion frame 16 that is disposed at the seat lower side of the seat cushion 12, is configured joined by welding or the like to plural plate members, including side plate sections 18, and is configured mountable with the cushion pad. Each side plate section 18 is formed in a rectangular plate shape extending along the seat front-rear direction, and an upper rail, not illustrated in the drawings, extending along the seat front-rear direction is attached to a lower end of each side plate section 18. The seat cushion 12 is coupled through the upper rails to a pair of left and right guide rails 20 disposed at the lower side of the seat cushion 12.

Each guide rail 20 extends along the vehicle front-rear direction with its vertical cross-section shape forming a U shape open at the seat upper side. Each of the upper rails described above is inserted into an inner portion of the respective guide rail 20 so as to enable sliding along the vehicle front-rear direction. The seat cushion 12 is thereby movable along the vehicle front-rear direction. A leg bracket 22 is provided at a vehicle front side end of the guide rail 20, and a leg bracket 23 is provided at a vehicle rear side end of the guide rail 20, and the leg brackets 22, 23 are fixed to a vehicle body floor by bolts (fastening members) 24. Part of the vehicle seat 10 at the lower side of the seat cushion 12, including the guide rail 20 and the respective leg brackets 22, 23, is covered by the leg cover 26.

Each leg cover 26 includes a cover main body 28 and cap members 52, described later, and is configured by a resin material such as polypropylene resin. The cover main body 28 is configured including a side wall 30 extending along the seat front-rear direction, an upper wall 32 facing the seat upper side, an upper wall 33 also facing the seat upper side, a vertical wall 34 facing the seat front side, and a vertical wall 35 facing the seat rear side.

In the cover main body 28 with the above configuration, the seat width direction outside of the guide rail 20 and the leg brackets 22, 23 are covered by the side wall 30. Moreover, the upper side of the leg bracket 22 is covered by the upper wall 32, and the upper side of the leg bracket 23 is covered by the upper wall 33. The seat front side of the leg bracket 22 is covered by the vertical wall 34, and the seat rear side of the leg bracket 23 is covered by the vertical wall 35.

Rectangular plate shaped cover portions 36 are provided at seat upper side ends of the respective vertical walls 34, 35. Thus a gap between the vertical wall 34 and the leg bracket 22, and a gap between the vertical wall 35 and the leg bracket 23, are covered at the seat upper sides by the cover portions 36.

The cover main body 28 is open at the seat front side of the guide rail 20, and at the seat rear side of the guide rail 20, such that movement of the seat cushion 12 along the vehicle front-rear direction is not impeded. A round bar shaped or wire shaped anchoring member, not illustrated in the drawings, spans across between the leg bracket 22 and the leg bracket 23, and the leg cover 26 is fixed to the anchoring member by anchoring an anchored portion, not illustrated in the drawings, provided to the side wall 30. Note that in FIG. 5, the left leg cover 26 is displayed offset toward the vehicle width direction left side in order to facilitate understanding of the relationships between the guide rail 20, the leg brackets 22, 23, and the leg cover 26.

As illustrated in FIG. 1, a feature of the present exemplary embodiment is a peripheral structure of an opening 38 formed to the upper wall 32 covering the upper side of the leg bracket 22, and a structure of the cap member 52 mounted in the opening 38. Detailed explanation follows regarding the peripheral structure of the opening 38 and the structure of the cap member 52, these being relevant portions of the present invention. Although not illustrated in the drawings, an opening 38 is also formed to the upper wall 33, similarly to the upper wall 32, and a cap member 52 is also mounted in this opening 38.

Figure 4A:
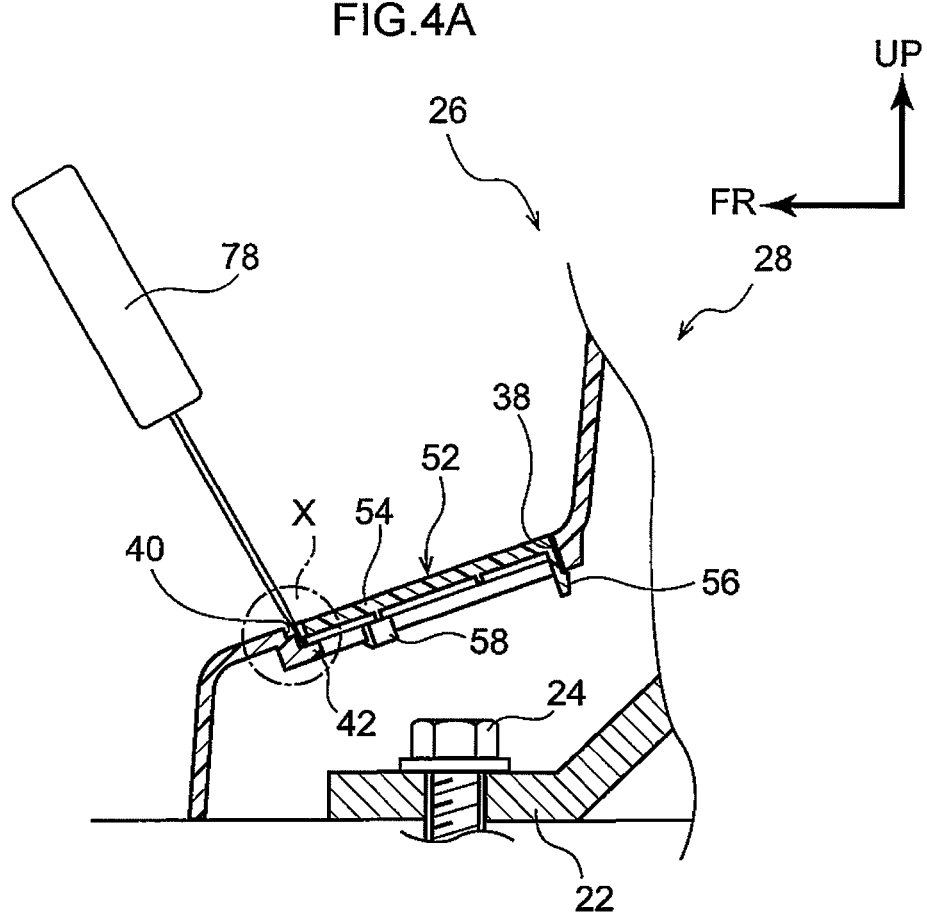
FIG. 4A is a cross-section (a cross-section illustrating a state taken along line 4-4 in FIG. 5) illustrating a relationship between a cover main body, a cap member and a tool when removing the cap member according to the first exemplary embodiment.
Figure 4B:
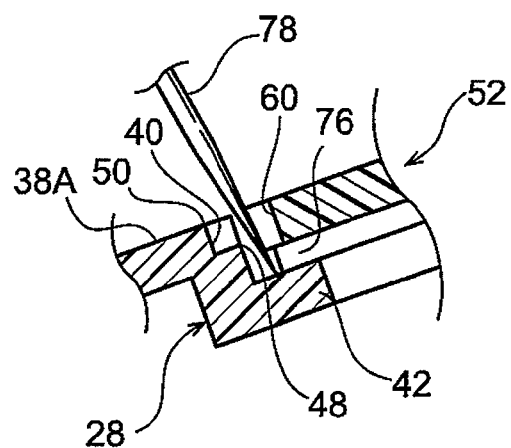
FIG. 4B is an enlarged cross-section (an enlarged diagram of the portion surrounded by the intermittent line 4-4 in FIG. 4A) illustrating a relationship between the cover main body, the cap member and the tool when removing the cap member according to the first exemplary embodiment.

Explanation first follows regarding the peripheral structure of the opening 38 of the cover main body 28. As illustrated in FIG. 2, FIG. 4A, and FIG. 4B, in plan view, the opening 38 is formed in a circular shape at the center of the upper wall 32, and is set disposed at the upper side of the bolt 24 that fixes the leg bracket 22 in an assembled state of the vehicle seat 10 to the vehicle body. The size of the opening 38 is set so that sufficient space is obtained for a fastening operation of the bolt 24.

A recessed portion 40, formed in a rectangular shape in plan view, is formed to a peripheral edge 38A of the opening 38 at the seat front side of the opening 38. The seat rear side (the cap member 52 side) of the recessed portion 40 is in communication with the opening 38, and the size of the recessed portion 40 is set to enable insertion of a leading end of a tool 78, employed when removing the cap member 52, described later.

A bearing portion 42, supporting a rib portion 62, described later, of the cap member cap member 52, is integrally provided to the cover main body 28 at the lower side of the recessed portion 40. The bearing portion 42 is formed in a circular ring shape running around the peripheral edge 38A of the opening 38 in plan view. The bearing portion 42 is cut out at three locations, thereby forming anchoring portions 44, 46 that anchor anchored portions 56, 58 of the cap member 52, described later. Specifically, the anchoring portion 44 is disposed at a position that has point symmetry to the recessed portion 40 about the center of the opening 38 in plan view, and the two anchoring portions 46 are disposed at positions that are at equal intervals from the anchoring portion 44 around the peripheral edge 38A of the opening 38.

As illustrated in detail in FIG. 4B, a vertical cross-section profile of the peripheral edge 38A of the opening 38 configured including the recessed portion 40 and the bearing portion 42 forms a stepped profile. Thus an edge at the opening 38 side of the recessed portion 40 (hereafter referred to as a first pivot point 48), and an edge at the seat upper side of the recessed portion 40 (hereafter referred to as a second pivot point 50) function as pivot points of the tool 78 when removing the cap member 52.

Figure 3A:
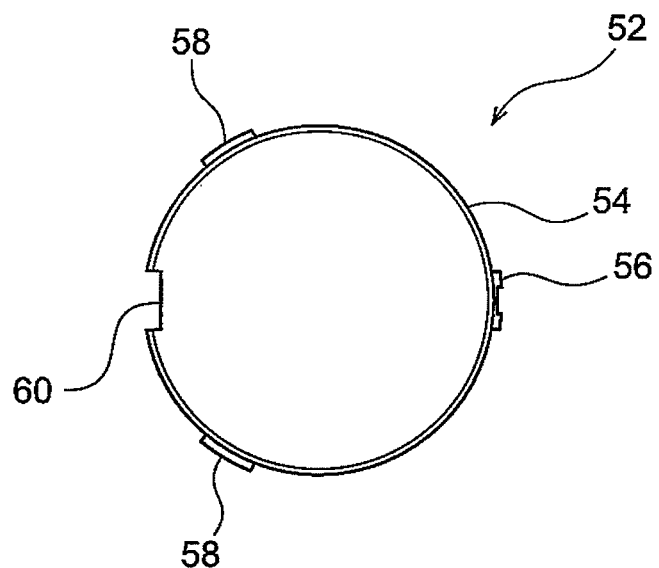
FIG. 3A is a plan view of a cap member according to the first exemplary embodiment.
Figure 3B:
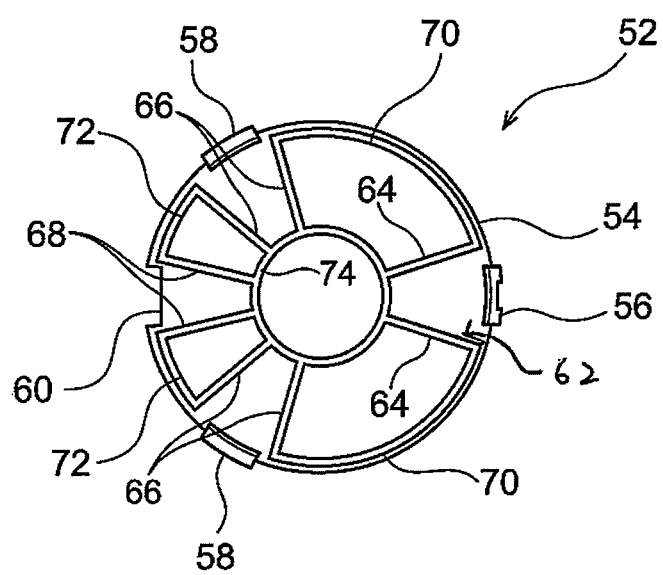
FIG. 3B is a back face view of a cap member according to the first exemplary embodiment.

As illustrated in FIG. 3A, and FIG. 3B, the cap member 52 is configured including a cap main body 54 formed in a circular plate shape in plan view, the anchored portions 56, 58 provided to an outer peripheral portion of the cap main body 54, and the rib portion 62. Specifically, the size of the cap main body 54 is set so as to be contained within the opening 38 of the cover main body 28, the anchored portion 56 is disposed corresponding to the anchoring portion 44, and the two anchored portions 58 are disposed corresponding to the respective anchoring portions 46. The anchored portions 56, 58 are anchored to the respective anchoring portions 44, 46, thereby mounting the cap member 52 in the opening 38 of the cover main body 28. Namely, the cap member 52 is disposed at the upper side of the bolt 24 fixing the leg bracket 22, and functions as a cosmetic member covering and hiding the bolt 24.

A cutout portion 60, formed in a rectangular shape in plan view and serving as a marker portion, is formed to the outer peripheral portion of the cap main body 54 at a position facing the recessed portion 40 of the cover main body 28, in a mounted state of the cap member 52 in the opening 38 of the cover main body 28. The cutout portion 60 is open at the radial direction outside of the cap member 52. In other words, the cutout portion 60 is open at the recessed portion 40 side in the mounted state of the cap member 52 in the opening 38 of the cover main body 28. The size of the cutout portion 60 is set to enable insertion of the tool 78, thereby enabling the tool 78 to be inserted through the cutout portion 60 and enabling the leading end of the tool 78 to abut the bearing portion 42 of the cover main body 28.

Note that the anchored portion 56 is provided at a position that has point symmetry to the cutout portion 60 about the center of the cap member 52 in plan view, and functions as a pivot point of the cap member 52 when removing the cap member 52.

The rib portion 62 is configured including radial direction ribs 64, 66, 68, outer circumferential direction ribs 70, 72, and an inner circumferential direction rib 74. Specifically, the radial direction ribs 64 extend from the vicinity of both ends of the anchored portion 56 in the circumferential direction of the cap member 52 toward the center of the cap main body 54. The radial direction ribs 66 extend from the vicinity of both ends of each of the anchored portions 58 in the circumferential direction of the cap member 52 toward the center of the cap main body 54. The radial direction ribs 68 extend from the vicinity of both ends of the cutout portion 60 in the circumferential direction of the cap member 52 toward the center of the cap main body 54.

The outer circumferential direction ribs 70 extend around the circumferential direction of the cap member 52, and couple together ends of adjacent radial direction ribs 64 and radial direction ribs 66 at the radial direction outside of the cap member 52. The outer circumferential direction ribs 72 extend along the circumferential direction of the cap member 52, and couple together ends of adjacent radial direction ribs 66 and radial direction ribs 68 at the radial direction outside of the cap member 52. Ends of the radial direction ribs 64, 66, 68 at the radial direction inside of the cap member 52 are coupled to the inner circumferential direction rib 74, formed in a circular cylinder shape.

In the cap member 52 provided with the rib portion 62 with the above configuration, the outer circumferential direction ribs 70, 72 are supported by the bearing portion 42 provided to the cover main body 28, in the mounted state of the cap member 52 in the opening 38 of the cover main body 28. This may also be understood as a configuration in which the rib portion 62 projects out toward the cover main body 28 side. Moreover, a peripheral edge of the cutout portion 60 provided to the cap member 52, and the bearing portion 42, are disposed facing each other across a space 76. In other words, the peripheral edge of the cutout portion 60 and the bearing portion 42 are disposed separated at a specific distance from each other. Note that, since that radial direction ribs 64, 66, 68 are disposed in a radial shape, the rib portion 62 also contributes to improving the rigidity of the cap member 52.

Operation and Advantageous Effects of Present Exemplary Embodiment

Explanation follows regarding the operation and advantageous effects of the present exemplary embodiment.

As illustrated in FIG. 1 to FIG. 3B, in the present exemplary embodiment, the opening 38 is provided to the resin cover main body 28, and the anchoring portions 44, 46 are formed running around the peripheral edge 38A of the opening 38. The anchored portions 56, 58, corresponding to the anchoring portions 44, 46, are provided at the outer peripheral portion of the cap main body 54 of the resin cap member 52. Thus the cap member 52 is mounted in the opening 38 of the cover main body 28, and the opening 38 is covered by the cap main body 54 by anchoring the anchored portions 56, 58 to the anchoring portions 44, 46 when attaching the cap member 52. The bolt 24 fixing the leg bracket 22 is accordingly covered and hidden by the cap member 52, enabling a good quality external appearance of a lower section of the vehicle seat 10 to be maintained.

The recessed portion 40 is formed to the peripheral edge 38A of the opening 38, such that the cap member 52 side of the recessed portion 40 is in communication with the opening 38, and the leading end of the tool 78 for removing the cap member 52 is insertable through the recessed portion 40. Thus by inserting the leading end of the tool 78 into the recessed portion 40, abutting the leading end against the cap member 52, and lifting up the cap member 52 using the tool 78 when removing the cap member 52, the anchored portions 56, 58 of the cap member 52 can be detached from the anchoring portions 44, 46 of the cover main body 28. Note that a flat-head screwdriver or the like may be employed as the tool 78, or a dedicated tool may be prepared as appropriate.

If there was no marker on the cap member 52 to indicate the attachment direction, the cap member 52 would need to be attached after visibly checking the positions of the anchored portions 56, 58 of the cap member 52 and the positions of the anchoring portions 44, 46 of the cover main body 28, thus the working time would be longer. Moreover, if the checking of the positions of the anchored portions 56, 58 of the cap member 52 and the positions of the anchoring portions 44, 46 of the cover main body 28 was neglected, it is conceivable that the anchored portions 56, 58 of the cap member 52 could be damaged due to incorrect assembly.

However, in the present exemplary embodiment, the cutout portion 60 is provided to the outer peripheral portion of the cap main body 54 at a position facing the recessed portion 40 of the cover main body 28. This enables the positions of the anchoring portions 44, 46 of the cover main body 28 and the positions of the anchored portions 56, 58 of the cap member 52 to be aligned by disposing the cap member 52 so that the cutout portion 60 of the cap member 52 and the recessed portion 40 of the cover main body 28 face each other when attaching the cap member 52.

Thus in the present exemplary embodiment, the position of the cap member 52 can be aligned without visually checking the positions of the anchored portions 56, 58 of the cap member 52 and the positions of the anchoring portions 44, 46 of the cover main body 28 when attaching the cap member 52. This accordingly enables incorrect assembly of the cap member 52 to be prevented, while securing workability when attaching and removing the cap member 52.

In the present exemplary embodiment, the first pivot point 48 and the second pivot point 50, these being pivot points of the tool 78 when removing the cap member 52, are provided to the recessed portion 40 of the cover main body 28, such that the tool 78 acts as a lever with the first pivot point 48 and the second pivot point 50 as pivot points. To explain specifically using FIG. 4B, when removing the cap member 52, first, the tool 78 acts as a lever with the first pivot point 48 as the pivot point, and lifts up the cap member 52. Then, when the cutout portion 60 side of the cap member 52 has been lifted up to a specific height, the pivot point of the tool 78 shifts to the second pivot point 50, and the cap member 52 is lifted up even further. Thus in the present exemplary embodiment, employing the tool 78 as a lever when removing the cap member 52 enables the cap member 52 to be removed without applying a large force.

In the present exemplary embodiment, the rib portion 62 projecting out toward the cover main body 28 side is formed to the cap main body 54, and the bearing portion 42 supporting the rib portion 62 is integrally provided to the cover main body 28 at the peripheral edge 38A of the opening 38 of the cover main body 28. The cutout portion 60 is provided to the cap main body 54. The cutout portion 60 is formed open at the recessed portion 40 side of the cover main body 28, enabling the leading end of the tool 78 to abut the bearing portion 42. The peripheral edge of the cutout portion 60 and the bearing portion 42 of the cover main body 28 are disposed facing each other across the space 76. This enables the tool 78 to be inserted into the space 76 between the peripheral edge of the cutout portion 60 and the bearing portion 42 of the cover main body 28 while being inserted into the cutout portion 60 of the cap member 52 when removing the cap member 52. This enables the cap member 52 to be lifted up from the lower side of the cap member 52 and removed using the tool 78. Thus in the present exemplary embodiment, force can be efficiently transmitted from the tool 78 to the cap member 52 when removing the cap member 52.

In addition, in the present exemplary embodiment, the anchored portion 56 is provided at a position that has point symmetry to the cutout portion 60 about the center of the cap member 52 in plan view, and functions as a pivot point of the cap member 52 when removing the cap member 52. Thus the anchored portion 56 forms the pivot point about which the cap member 52 turns when removing the cap member 52, thereby enabling a moment arm of moment occurring in the cap member 52 to be lengthened. This enables force to detach the anchored portions 58 from the anchoring portions 46 of the cover main body 28 to be increased when removing the cap member 52. Thus, when removing the cap member 52 in the present exemplary embodiment, the cap member 52 can be employed as a lever, and the cap member 52 can be removed without applying a large force. Moreover, a large force is not directly applied to the cap member 52 from the tool 78, thereby enabling damage to the cap member 52 to be suppressed, such that the cap member 52 can be reused.

Note that, although in the present exemplary embodiment the tool 78 is employed as a lever to remove the cap member 52, a tool with a hook shaped leading end may be employed to remove the cap member 52 by pulling the cap member 52 directly upward.

Second Exemplary Embodiment

Figure 6:
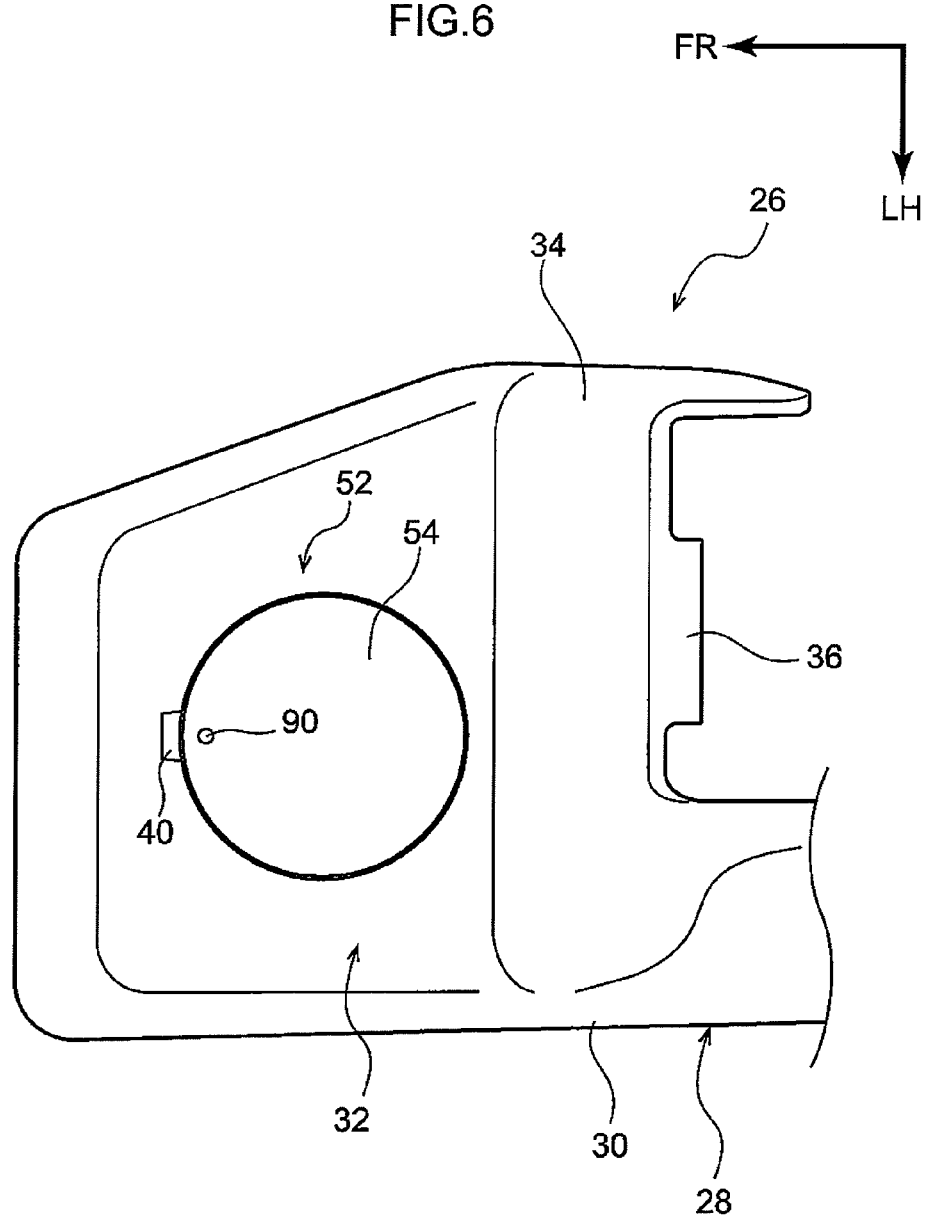
FIG. 6 is an enlarged plan view illustrating a relationship between a cover main body and a cap member according to a second exemplary embodiment.

Explanation follows regarding a configuration of a leg cover 26 according to a second exemplary embodiment of the present invention, with reference to FIG. 6. Note that the same reference numerals are applied to similar configuration portions to the first exemplary embodiment described above, and explanation thereof is omitted.

Although the cutout portion 60 is provided to the cap member 52 as a marker portion in the first exemplary embodiment described above, as illustrated in FIG. 6, a protruding portion 90 that is circular shaped in plan view may be provided as a marker portion.

A cap member 52 with such a configuration also enables the attachment direction of the cap member 52 to be checked by touching the protruding portion 90. Note that the shape of the protruding portion 90 is not limited to the above, and various shapes, such as a triangular shape or an arrow shape in plan view, may be applied.

Additional Explanation of Above Exemplary Embodiments (1) Although the cap main body 54 of the cap member 52 is formed in a circular plate shape in plan view in the exemplary embodiments described above, various shapes, such as a rectangular plate shape, may be applied. Moreover the shape and placement of the anchored portions 56, 58 may also be changed as appropriate, within a range that does not impair attachment and removal of the cap member 52.

(2) Although the exemplary embodiments described above are configured with three anchored portions provided to the cap member 52, configuration may be changed as appropriate according to the shape and size of the cap member 52.

What is claimed is:

1. A vehicle-use resin cover for covering a fastener opening comprising:
   a resin cover main body that is configured including an opening, and anchoring portions formed at a plurality of locations running along a peripheral edge of the opening;
   a resin cap member that is mounted in the opening and that is configured including a cap main body that covers the opening, and a plurality of anchored portions that are provided to an outer peripheral portion of the cap main body so as to correspond to the anchoring portions and that are anchored by the anchoring portions;
   a recessed portion that is formed at the peripheral edge of the opening, that is in communication with the opening at the cap member side of the recessed portion, and through which a leading end of a tool for removing the cap member is insertable; and
   a marker portion having an inward cutout that is provided to the outer peripheral portion of the cap main body at a position facing the recessed portion,
   wherein the marker potion is located between two of the plurality of anchored portions.

2. The vehicle-use resin cover of claim 1, wherein a pivot point is provided to the recessed portion so as to configure a pivot point of the tool when removing the cap member.

3. The vehicle-use resin cover of claim 1, wherein:
   a rib portion that projects out toward the cover main body side is formed to the cap main body;
   a bearing portion that supports the rib portion is integrally provided to the cover main body at the peripheral edge of the opening; and
   the marker portion is configured by a cutout portion that is formed open at the recessed portion side so as to enable the leading end of the tool to abut the bearing portion, and is disposed such that a peripheral edge of the cutout portion and the bearing portion face each other across a space.

4. The vehicle-use resin cover of claim 1, wherein:
   one of the anchored portions is provided at a position with point symmetry to the marker portion about the center of the cap member in a plan view, and configures a pivot point of the cap member when removing the cap member.

* * * * *